(12) United States Patent
Kim (10) Patent No.: US 8,465,866 B2
(45) Date of Patent: Jun. 18, 2013

(54) BATTERY MODULE INCLUDING A PRESSURE CONTROL UNIT

(75) Inventor: Tae-Yong Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 302 days.

(21) Appl. No.: 12/852,800

(22) Filed: Aug. 9, 2010

(65) Prior Publication Data
US 2011/0262797 A1    Oct. 27, 2011

Related U.S. Application Data

(60) Provisional application No. 61/282,913, filed on Apr. 21, 2010.

(51) Int. Cl.
*H01M 6/42* (2006.01)
(52) U.S. Cl.
USPC ............ 429/149; 429/158; 429/159; 429/186
(58) Field of Classification Search
USPC ................. 429/149, 150, 151, 156, 159, 186, 429/99, 100, 158, 160
See application file for complete search history.

(56) References Cited

U.S. PATENT DOCUMENTS

| | | |
|---|---|---|
| 2,812,376 A | 11/1957 | Yardney |
| 6,162,559 A | 12/2000 | Vutetakis et al. |
| 6,641,951 B1 | 11/2003 | Vutetakis et al. |
| 2003/0017387 A1* | 1/2003 | Marukawa et al. ........... 429/156 |

FOREIGN PATENT DOCUMENTS

| | | |
|---|---|---|
| EP | 0 989 618 A1 | 3/2000 |
| JP | 2009-081056 A | 4/2009 |

OTHER PUBLICATIONS

European Search Report issued in corresponding European application, 11 15 9148, dated Jul. 4, 2011.
Office Action issued in corresponding Korean application, 10-2010-0076965, dated Sep. 26, 2011.

* cited by examiner

*Primary Examiner* — Raymond Alejandro
(74) *Attorney, Agent, or Firm* — Lee & Morse, P.C.

(57) ABSTRACT

A battery module, battery pack, and electric vehicle, the battery module including a plurality of unit battery cells; a pair of end plates coupled together in a spaced relationship for receiving the unit battery cells therebetween; and a pressure control unit between the unit battery cells and the at least one end plate.

16 Claims, 7 Drawing Sheets

BATTERY MODULE INCLUDING A PRESSURE CONTROL UNIT

CROSS-REFERENCE TO RELATED APPLICATION

The present application claims priority under 35 U.S.C. §119(e) to U.S. Provisional Application No. 61/282,913, filed on Apr. 21, 2010, and entitled: "Battery Module," which is incorporated herein by reference in its entirety.

BACKGROUND

1. Field

Embodiments relate to a battery module.

2. Description of the Related Art

Secondary batteries are rechargeable batteries, as opposed to primary batteries that cannot be recharged. Secondary batteries are broadly used in high-tech electronic devices, e.g., cellular phones, notebook computers, and camcorders, and also are used in vehicles.

A secondary battery may include an electrode assembly and an electrolyte. The electrode assembly may include a positive plate, a negative plate, and a separator. The electrolyte may include lithium ions. The positive and negative plates of the electrode assembly may each include an electrode tab protruding outward.

The electrode assembly may be accommodated in a case and electrode terminals may be exposed outside the case. The electrode tabs may protrude outside the electrode assembly so as to be electrically connected to the electrode terminals. The case may have, e.g., a cylindrical shape or a rectangular parallelepiped shape.

A plurality of unit battery cells, e.g., secondary batteries, may be horizontally or vertically stacked so as to form a battery module. Also, a plurality of battery modules may be vertically and/or horizontally stacked so as to form one battery pack.

SUMMARY

Embodiments are directed to a battery module, which represents advances over the related art.

It is a feature of an embodiment to provide a battery module that is formed by vertically or horizontally stacking a plurality of unit battery cells, such a battery module facilitating control of a coupling force in a direction in which the plurality of unit battery cells are stacked.

At least one of the above and other features and advantages may be realized by providing a battery module including a plurality of unit battery cells; a pair of end plates coupled together in a spaced relationship for receiving the unit battery cells therebetween; and a pressure control unit between the unit battery cells and the at least one end plate.

The pressure control unit may include an elastic plate; a support, the support supporting one end of the elastic plate, a control screw, the control screw being configured to adjust an elasticity of the elastic plate; and a screw support, the screw support being coupled to the end plate and supporting the control screw.

An end of the control screw may protrude to an outside of the battery module.

The elastic plate may include a support groove and a control groove, the support groove being coupled to the support and the control groove being coupled to the control screw.

The support groove and the control groove of the elastic plate may be spaced apart a first length L1 in an uninstalled condition of the elastic plate, and the support groove and the control groove of the elastic plate may be spaced apart a second length L2 in an installed condition of the elastic plate, such that, through the control screw, the second length L2 becomes adjustably less than the first length L1 and the elastic plate has an arched configuration at a central region thereof bowing inwardly a distance d from the inner side of the end plates to thereby act as a plate spring.

The support may include an insertion groove, the insertion groove corresponding to and being coupled to the support groove of the elastic plate.

The support may protrude from a surface of the end plate.

The screw support may be disposed opposite to the support on the at least one end plate.

The control screw may have screw threads on an outer circumference thereof, the screw support may have screw threads on an inner circumference thereof, and the screw threads of the control screw may mate with the screw threads of the screw support.

The battery module may further include an intermediate frame coupled to the end plates.

The intermediate frame may include at least one of an upper frame coupled to the end plates; a lower frame coupled to the end plates; and a side frame coupled to the end plates.

The pressure control unit may be configured to apply pressure to the plurality of unit battery cells between the pair of end plates.

The pressure control unit may be configured to control an amount of pressure applied to the unit battery cells in restraining the amount of displacement thereof due to expansion and contraction.

The battery module may include a plurality of the pressure control units, each pressure control unit being between the unit battery cells and one of the end plates.

At least one of the above and other features and advantages may also be realized by providing a battery pack including the battery module of an embodiment.

At least one of the above and other features and advantages may also be realized by providing an electric vehicle including the battery pack of an embodiment.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer or element is referred to as being "on" another element, it can be directly on the other element, or intervening elements may also be present. Further, it will be understood that when an element is referred to as being "under" another element, it can be directly under, and one or more intervening elements may also be present. In addition, it will also be understood that when an element is referred to as being "between" two elements, it can be the only element between the two elements, or one or more intervening elements may also be present. Like reference numerals refer to like elements throughout.

A battery pack 10 according to an embodiment may be formed by stacking at least one battery module 100 vertically and/or horizontally. Each of the battery modules 100 may be formed by stacking at least one unit battery cell 110 vertically and/or horizontally.

Each of the stacked unit battery cells 110 may expand or contract when charge or discharge occurs. In this case, volume expansion of the unit battery cells 110 may increase resistance and thus degrade the efficiency of the unit battery cells 110. Accordingly, pressure may need to be applied to the stacked unit battery cells 110.

To this end, the stacked unit battery cells 110 may be supported at both ends by end plates 150. Accordingly, the unit battery cells 110 may be compressed and fixed so as not to further extend horizontally due to expansion and contraction.

In the battery module 100 according to an embodiment, elastic plates 161 that control or adjust elasticity may be inserted between the end plates 150 and the unit battery cells 110, thereby controlling or adjusting pressure that is to be applied to the stacked unit battery cells 110. Thus, the pressure that is to be applied to the stacked unit battery cells 110 may be set for each of the battery modules 100. In addition, even when characteristics of the unit battery cells 110 stacked in the battery module 100 are changed, optimal performance may be achieved.

Figure 1:
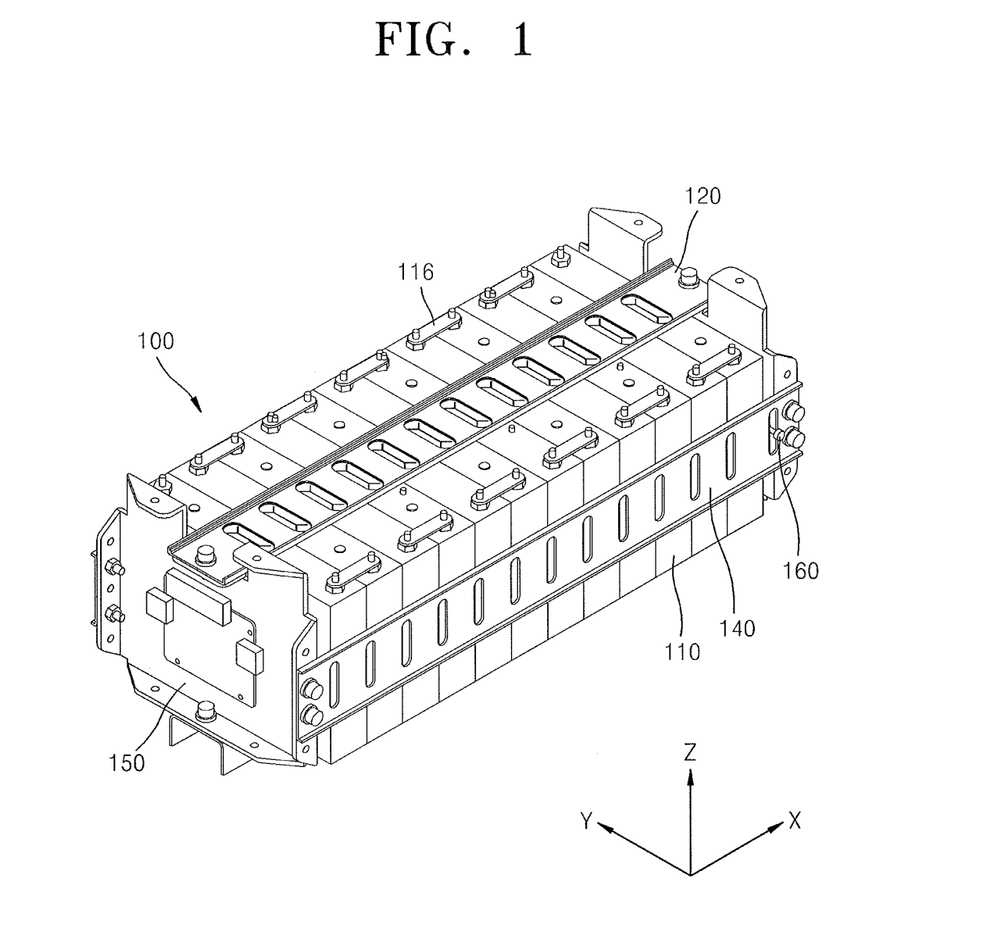
FIG. 1 illustrates a perspective view of a battery module included in a battery pack formed by stacking a plurality of unit battery cells according to an embodiment.
Figure 2:
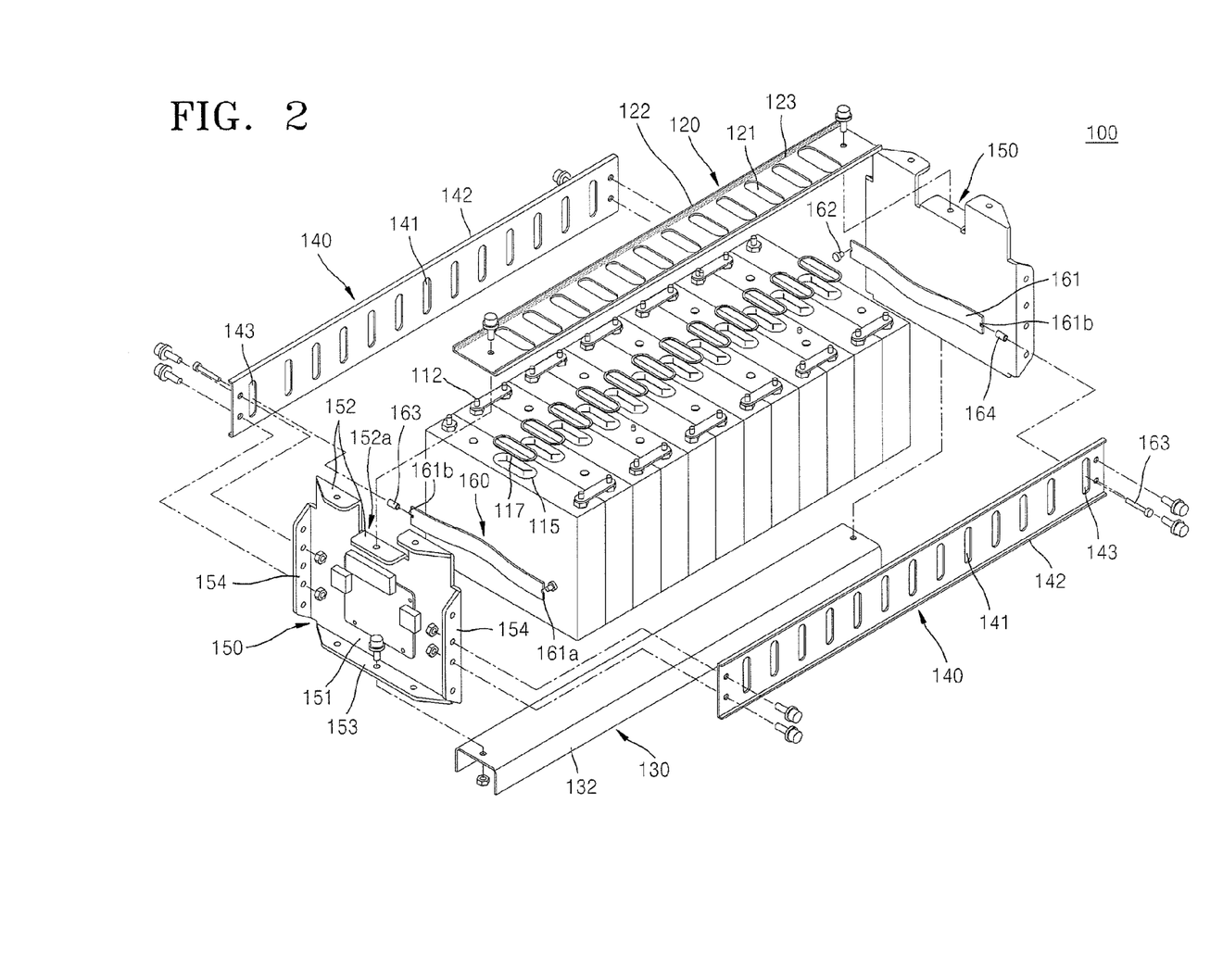
FIG. 2 illustrates an exploded perspective view of components of the battery module of FIG. 1.

FIG. 1 illustrates a perspective view of a battery module 100 according to an embodiment, which may be formed by stacking a plurality of unit battery cells 110 horizontally. FIG. 2 illustrates an exploded perspective view of components of the battery module 100 of FIG. 1. A battery pack may be formed by stacking a plurality of the battery modules 100 vertically and/or horizontally.

Referring to FIGS. 1 and 2, the battery module 100 may include the plurality of unit battery cells 110, an upper frame 120, a lower frame 130, side frames 140, the end plates 150, and a pressure control unit 160.

The unit battery cells 110 may be stacked in a first direction to form the battery module 100. The upper frame 120 may be disposed above the unit battery cells 110 stacked in the first direction so as to support the unit battery cells 110 in a second direction. The lower frame 130 may be disposed below the unit battery cells 110 stacked in the first direction so as to support the unit battery cells 110 from below.

The side frames 140 may be disposed on sides of the unit battery cells 110 stacked in the first direction so as to support the unit battery cells 110 at sides thereof. A pair of the end plates 150 may be disposed on both ends, respectively, of the unit battery cells 110 stacked in the first direction so as to support the unit battery cells 110 from both ends. The pressure control unit 160 may be installed between each of the end plates 150 and the unit battery cells 110 so as to control or adjust a pressure that is to be applied to the stacked unit battery cells 110.

Here, the first direction may be the X direction and the second direction may be the Z direction. In this case, if the battery pack 10 is horizontally disposed, the X direction may be a horizontal direction and the Z direction may be a vertical direction. However, the X and Z directions are not limited thereto and may be differently regarded according to the arrangement direction of the battery pack 10.

Figure 3:
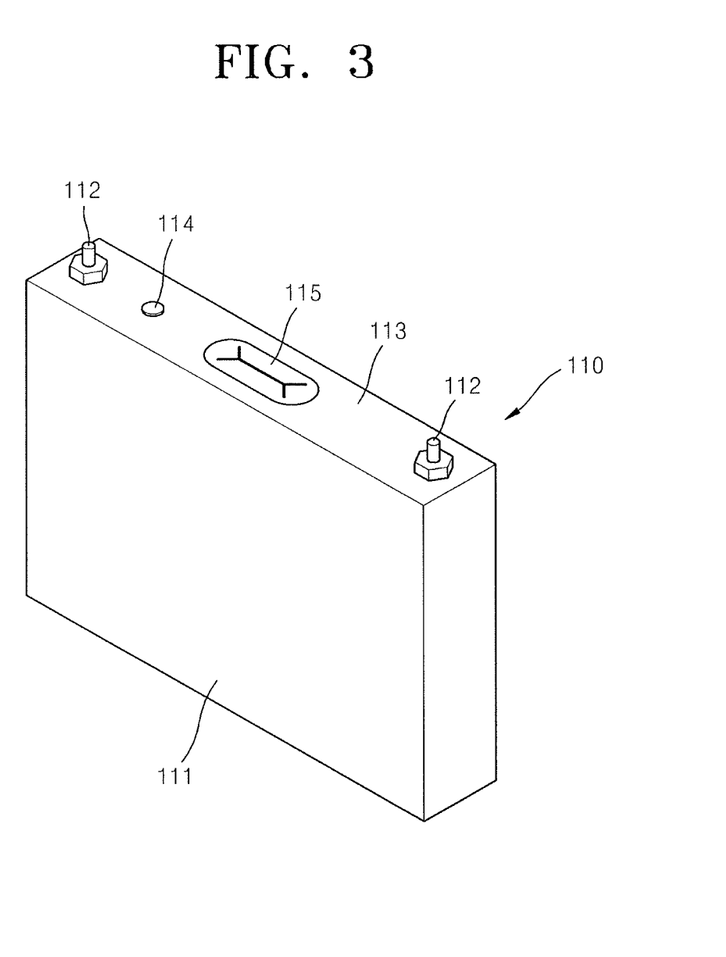
FIG. 3 illustrates a schematic perspective view of an exterior of a unit battery cell included in the battery module of FIG. 1.

FIG. 3 illustrates an exterior of one of the unit battery cells 110 included in the battery module 100 of FIG. 1. A plurality of the unit battery cells 110 may be stacked in the horizontal direction so as to form the battery module 100 and may generally have a rectangular parallelepiped shape as illustrated in FIG. 3. However, the unit battery cells 110 are not limited to the rectangular parallelepiped shape and may also have various shapes, e.g., a cylindrical shape or a pouch shape.

The unit battery cells 110 may generally be secondary batteries. A secondary battery may include an electrode assembly and an electrolyte. The electrode assembly may include a positive plate, a negative plate, and a separator. The electrolyte may contain lithium ions. The positive and negative plates of the electrode assembly may be electrically connected to a current collector.

The electrode assembly may be accommodated in a case 111 and electrode terminals 112 may be exposed outside the case 111. The current collector electrically connected to the positive and negative plates may be electrically connected to the electrode terminals 112 within the case 111. The case 111 may have, e.g., a cylindrical shape or a rectangular parallelepiped shape. In an implementation, the unit battery cell 110 may include a plurality of electrode assemblies in one case 111.

A plurality of unit battery cells 110 may be horizontally stacked so as to form the battery module 100. In the battery module 100, the electrode terminals 112 of neighboring unit battery cells 110 may be electrically connected to each other. In this case, the electrode terminals 112 of the neighboring unit battery cells 110 may be electrically connected by using bus bars 116.

The neighboring unit battery cells 110 may be disposed so that polarities of neighboring electrode terminals thereof are opposite to each other. A plurality of unit battery cells 110 may be connected in parallel, in series, or both in parallel and in series. Accordingly, the unit battery cells 110 may be continuously connected to each other so as to form one battery module 100. The connection method and the number of unit battery cells 110 to be stacked may be determined in consideration of desired electric capacities when the unit battery cells 110 are designed.

A cap plate 113 may be coupled to an opening of the case 111. The cap plate 113 may be a thin plate. An electrolyte inlet for injecting the electrolyte into the case 111 may be formed in the cap plate 113. The electrolyte inlet may be sealed with a sealing plug 114 after the electrolyte is injected.

A vent member 115 in which grooves are formed may be formed on the cap plate 113 such that the vent member 115 may be broken when a predetermined internal pressure is reached. If the upper frame 120 is disposed on the unit battery cells 110 that are horizontally stacked, exhaust outlets 121 of the upper frame 120 may be disposed on vent members 115.

The unit battery cells 110 according to the present embodiment may be lithium-ion secondary batteries as described above. However, the unit battery cells 110 are not limited to the lithium-ion secondary batteries and may also be various batteries, e.g., nickel-cadmium secondary batteries, nickel-hydrogen secondary batteries, lithium batteries, or the like.

Meanwhile, in each of the unit battery cells 110 containing lithium, the electrode assembly may expand or contract when charge or discharge occurs. In this case, the expansion and the contraction of the electrode assembly may apply physical force to the case 111. As such, the case 111 may physically expand and contract in correspondence with the expansion and the contraction of the electrode assembly.

The deformed shape of the case 111 due to repeated expansion and contraction may be fixed. The expansion in volume may increase resistance so as to reduce the efficiency of the unit battery cells 110. In order to prevent the reduction in efficiency, a pair of the end plates 150 may be disposed at respective ends of the stacked unit battery cells 110 so as to support the stacked unit battery cells 110. Accordingly, a predetermined pressure may be applied to the stacked unit battery cells 110.

Since the battery module 100 according to an embodiment may include the pressure control unit 160, a pressure that is to be applied to the stacked unit battery cells 110 may be controlled or adjusted. The pressure control unit 160 may be installed between each of the end plates 150 and the unit battery cells 110.

Figure 4:
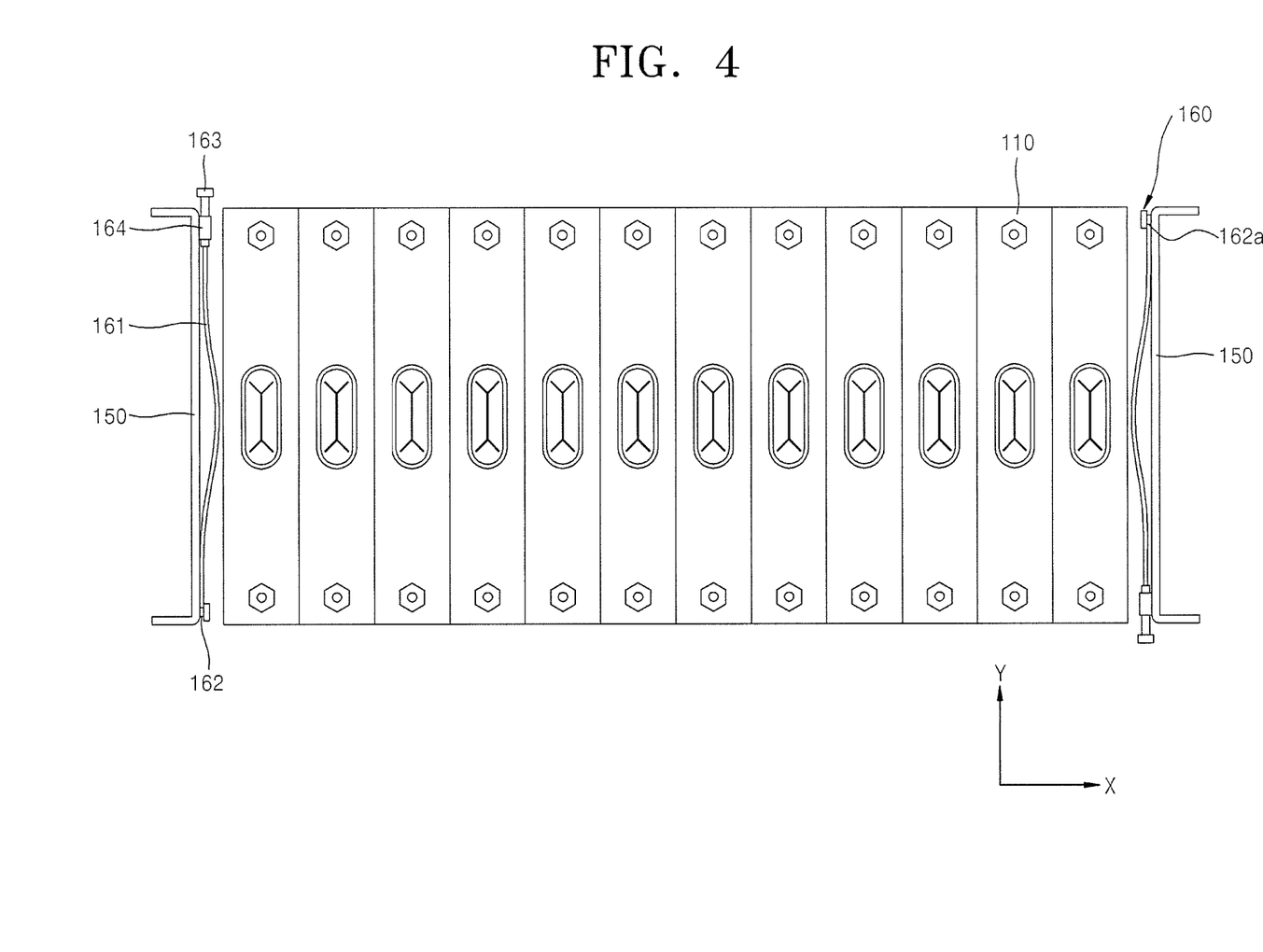
FIG. 4 illustrates a schematic top view of a pressure control unit interposed between each end plate and the stacked unit battery cells in the battery module of FIG. 1.

FIG. 4 illustrates the pressure control unit 160 interposed between each of the end plates 150 and the unit battery cells 110. The pressure control unit 160 may include an elastic plate 161, a support 162, a control screw 163, and a screw support 164.

The elastic plate 161 may be bent to form elasticity, i.e., to be elastically biased, in the X direction or −X direction. The support 162 may support one end of the elastic plate 161. The control screw 163 may be disposed opposite to the support 162 so as to control or adjust the elastic plate 161 relative to the support 162. The screw support 164 may support the control screw 163.

The elastic plate 161 may be installed so as to extend in the Y direction and be between each of the end plates 150 and the unit battery cells 110. One end of the elastic plate 161 may be supported by the support 162 and the other end thereof may be supported by the control screw 163. In this case, as the control screw 163 may be moved in the Y direction or a −Y direction, the elastic plate 161 may be bent to form an elastic force, i.e. to be elastically biased, in the X direction or −X direction.

In other words, since the elastic plate 161 may be bent by the control screw 163, the elastic plate 161 may act as a plate spring. In addition, due to the control of the control screw 163, the pressure to be applied to the unit battery cells 110 may be actively controlled.

Accordingly, the pressure to be applied to the unit battery cells 110 may be set differently for each of battery modules 100. Thus, in battery modules 100 each having the same structure, different pressures may be applied to the unit battery cells 100 of each of the battery modules 100 in a single battery pack.

In addition, even when characteristics of the unit battery cells 110 stacked in the battery module 100 are changed, optimal performance may be achieved. Thus, performance of the battery module 100 may be improved by periodic maintenance.

A support groove 161a may be formed on the one end of the elastic plate 161 that is supported by the support 162. A control groove 161b may be formed on the other end of the elastic plate 161 that is supported by the control screw 163. The elastic plate 161 may be stably supported by the support groove 161a and the control groove 161b.

The support groove 161a may stably contact the support 162 and thus may prevent the support 162 from sliding in a Z direction. The control groove 161b may stably contact the control screw 163 and thus may prevent the control screw 163 from sliding in the Z direction.

Figure 5A:
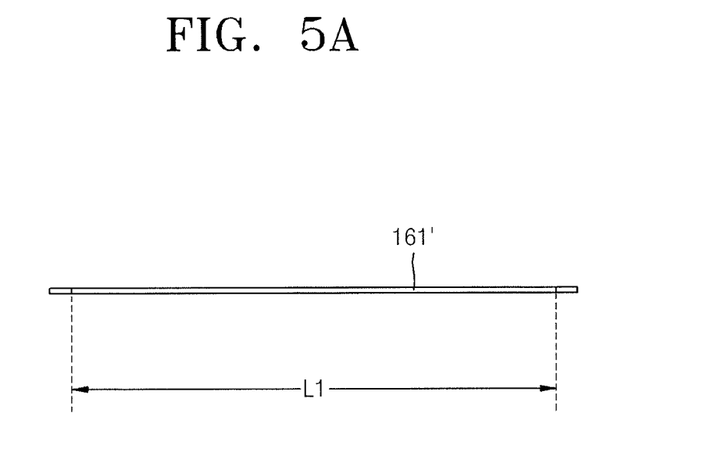
FIGS. 5A and 5B illustrate an elastic plate not yet installed and an installed elastic plate, respectively, in the battery module of FIG. 1.
Figure 5B:
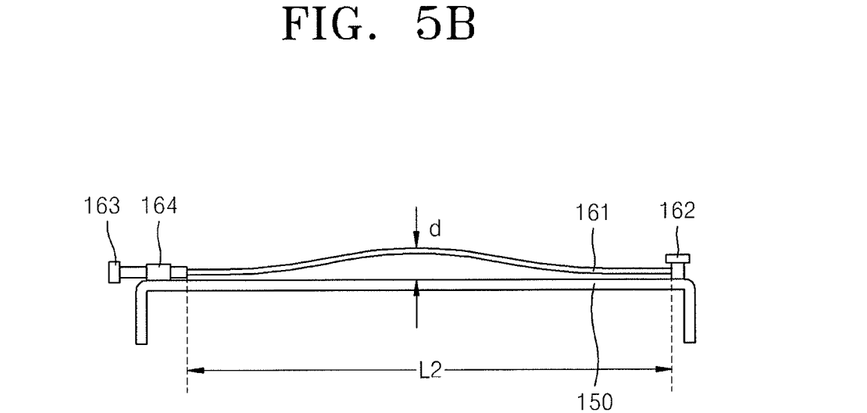

FIGS. 5A and 5B illustrate an elastic plate 161' not yet installed and an installed elastic plate 161, respectively. A distance between the support groove 161a and the control groove 161b, i.e., a width of the elastic plate 161' not yet installed in the pressure control unit 160, may be L1.

In the case of the elastic plate 161 installed in the pressure control unit 160, a distance between the support groove 161a and the control groove 161b is L2. When L2 becomes less than L1, the center of the elastic plate 161 may be bent by a distance "d", and the elasticity may be applied, i.e., the elastic plate may be elastically biased, in the X direction or the −X direction. In other words, the support groove 161a and the control groove 161b of the elastic plate 161 may be spaced apart a second length L2 in an installed condition of the elastic plate 161, such that, through the control screw 163, the second length L2 may become adjustably less than the first length L1 and the elastic plate 161 may have an arched configuration at a central region thereof bowing inwardly the distance d from the inner side of the end plates 150 to thereby act as a plate spring.

The support 162 may protrude from a surface of each of the end plates 150 that faces the unit battery cells 110. The support 162 may be fixed to each of the end plates 150 by, e.g., welding or screw coupling.

An insertion groove 162a into which one end of the elastic plate 161 is inserted may be formed on the support 162. Thus, the one end of the elastic plate 161 may be prevented from deviating from the support 162 in the X direction or the −X direction.

A part of the control screw 163 may protrude outward from a side of each of the end plates 150. In other words, as illustrated in FIG. 1, a part of the control screw 163 may protrude outwardly via screw holes 143, which are through holes, formed in each of the side frames 140. Thus, the control screw 163 may be moved in the Y direction or −Y direction by turning the exposed part of the control screw 163, thereby controlling or adjusting the pressure to be applied to the unit battery cells 110. In another implementation, a part of the control screw 163 may protrude outward via through holes (not illustrated) formed in each of the side frames 140.

The screw support 164 may support the control screw 163 so that the control screw 163 may be inserted into the screw support 164 and moved in the Y direction or −Y direction. The screw support 164 may protrude from the surface of each of the end plates 150 that faces the unit battery cells 110. The screw support 164 may be fixed to each of the end plates 150 by, e.g., welding or the like.

The control screw 163 may be a bolt having a screw thread on its outer circumference. In this case, a screw thread engaging or mating with the screw thread of the control screw 163 may be formed on an inner circumference of the screw support 164.

In the embodiment illustrated in FIGS. 1 through 5B, the elastic plate 161 may extend in the Y direction and may be accordingly bent in the X direction or the −X direction, so that elasticity may be applied, i.e., the elastic plate 161 may be elastically biased, in the X direction or the −X direction. However, the embodiments are not limited thereto; and the elastic plate 161 may be disposed in any direction as long as elasticity is applied, i.e., the elastic plate 161 is elastically biased, toward the unit battery cells 110.

A pair of the end plates 150 may be disposed at respective ends of the electrically connected unit battery cells 110 stacked in the horizontal direction and/or the vertical direction. The upper frame 120, the lower frame 130, and the side frames 140 may be disposed on upper, lower, and side surfaces, respectively, of the end plates 150 and may compress and fix the unit battery cells 110 such that the unit battery cells 110 do not extend in the horizontal direction due to expansion and contraction.

The pressure control unit 160 may be installed between one of the end plates 150 and a unit battery cell 110 at one end of the stacked unit battery cells 110. In an implementation, the pressure control unit 160 may be installed between the other end plate 150 and a unit battery cell 110 at the other end of the stacked unit battery cells 110. In another implementation, the pressure control unit 160 may be installed between each of the other end plates 150 and the unit battery cells 110 at the ends of the stack.

The end plates 150 may be disposed at both ends of the battery module 100. One surface of each of the end plates 150 may contact outer surfaces of the unit battery cells 110 disposed at both outermost sides of the battery module 100, so that the end plates 150 may support the stacked unit battery cells 110.

Each of the end plates 150 may include a base plate 151 and flanges 152, 153, and 154. The base plate 151 may have a size that is sufficient to cover an outer surface of the unit battery cells 110. Although the base plate 151 has an almost square shape in the present embodiment, the shape of the base plate 151 is not limited thereto.

The flanges 152, 153, and 154 may be bent from the base plate 151 away from the unit battery cells 110. The flanges 152, 153, and 154 may include top flanges 152, a bottom flange 153, and side flanges 154. The top flanges 152 may be coupled to the upper frame 120. The bottom flange 153 may be coupled to the lower frame 130. The side flanges 154 may be correspondingly coupled to the side frames 140.

Figure 6:
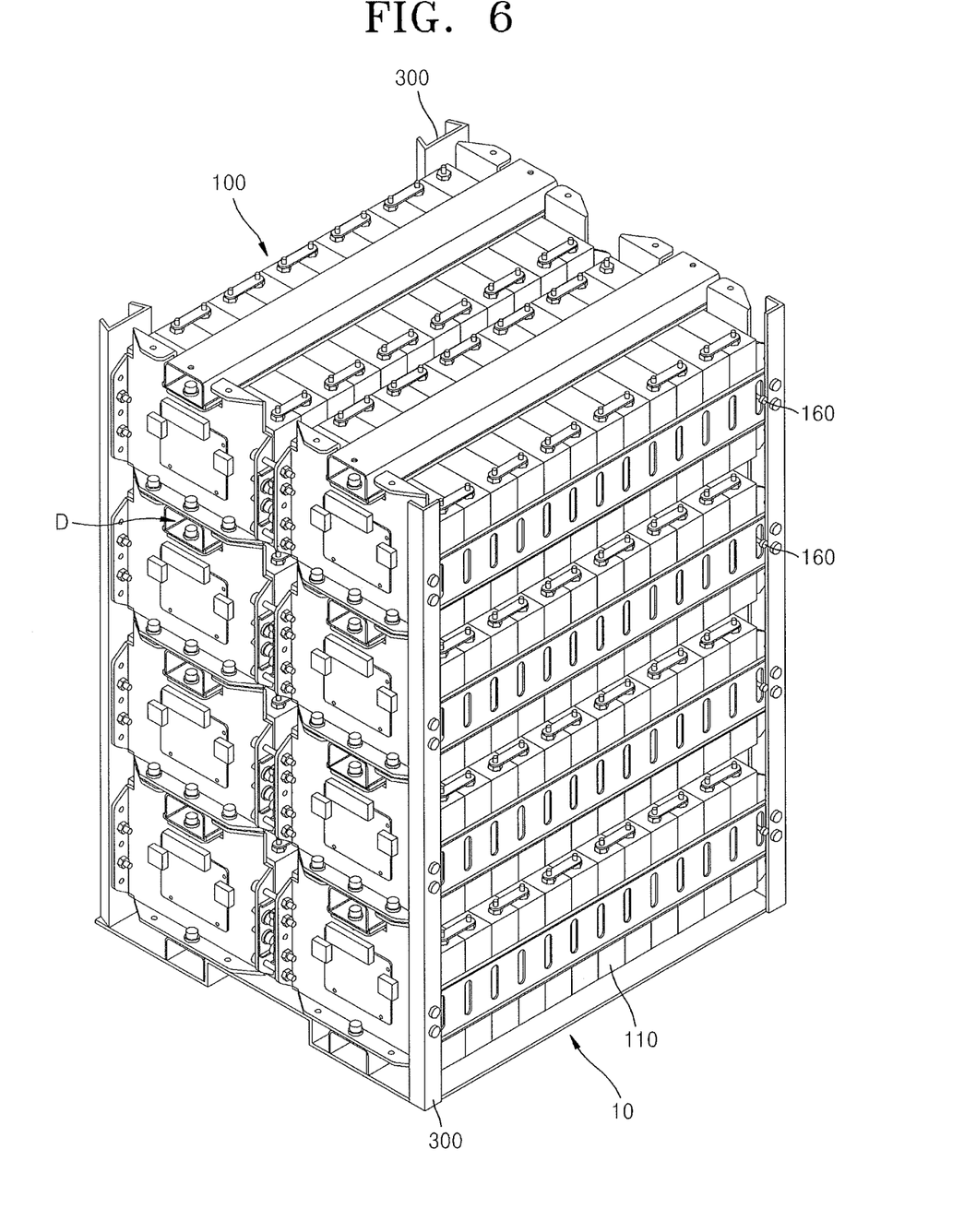
FIG. 6 illustrates a perspective view of a battery pack formed by stacking a plurality of the battery modules of FIG. 1 vertically and horizontally and supported by an external frame.

A plurality of the battery modules 100 may be vertically and/or horizontally stacked so as to form the battery pack 10. In this case, the end plates 150 of neighboring battery modules 100 may be coupled to each other so that the neighboring battery modules 100 are supported by each other.

In addition, the top flanges 152 of one battery module 100 may be coupled to the bottom flange 153 of a battery module 100 that is stacked thereabove. The bottom flanges 153 of one battery module 100 may be coupled to the upper flanges 152 of a battery module 100 that is stacked therebelow. The side flanges 154 of one battery module 100 may be coupled to the side flanges 154 of a battery module 100 adjacent thereto sidewards.

In this case, the top, bottom, and side flanges 152, 153, and 154 may be respectively screw-coupled to the upper frame 120, the lower frame 130, and the side frames 140 by using, e.g., bolts and nuts. However, the coupling method is not limited thereto and the top, bottom, and side flanges 152, 153, and 154 may be respectively coupled to the upper frame 120, the lower frame 130, and the side frames 140 by using various methods, e.g., welding.

The upper frame 120 may be disposed on the unit battery cells 110 stacked in the horizontal direction and may be coupled to the top flanges 152 corresponding to the upper surfaces of the end plates 150. In this case, the exhaust outlets 121 may be formed in the upper frame 120 at positions corresponding to the vent members 115 of the unit battery cells 110.

The upper frame 120 may have upper frame bent portions 122 bent from lengthwise edges of the upper frame 120. A sealing member 123 may be formed on inner surfaces of the upper frame bent portions 122. In this case, the sealing member 123 may be formed of an elastic material, e.g., rubber. The upper frame 120 of one battery module 100 may have the lower frame 130 of a battery module 100 stacked thereabove and the sealing member 123 fit therein and may be coupled to the same, thereby forming a sealed gas discharge passage.

Sealing rings 117 may be disposed between the upper frame 120 and the vent members 115 such that a gas ejected from the vent members 115 flows outward through the exhaust outlets 121 of the upper frame 120 without influencing neighboring unit battery cells 110.

The sealing rings 117 may be, e.g., O rings. In this case, grooves 152a in which the upper frame 120 is to be seated may be formed at central regions of the upper portions of the end plates 150. Accordingly, the exhaust outlets 121 of the upper frame 120 may closely contact the unit battery cells 110.

Also, the sealing rings 117 between the unit battery cells 110 and the upper frame 120 may each have a sufficient thickness. As such, when the upper frame 120 is coupled to the end plates 150, the upper frame 120 may apply pressure down on the unit battery cells 110 so as to compress the sealing rings 117 interposed therebetween and thus the upper frame 120 may closely contact the unit battery cells 110.

The lower frame 130 may be disposed under the unit battery cells 110 so as to support the weight of the unit battery cells 110 and may be connected to the bottom flanges 153 of the end plates 150. In order to support the weight of the unit battery cells 110, the lower frame 130 may include lower frame bent portions 132 bent away from the unit battery cells 110.

The lower frame bent portions 132 may be bent downward. The lower frame bent portions 132 of one battery module 100 may be coupled to the upper frame 120 of a battery module 100 stacked therebelow, thereby forming a gas passage. In this case, the gas passage formed by combining the lower frame 130 of one battery module 100 and the upper frame 120 of the battery module 100 stacked therebelow may function as a degassing duct for discharging a generated gas.

The lower frame 130 of one battery module 100 and the upper frame 120 of a battery module 100 stacked therebelow may discharge a gas in a sealed state or may serve as a gas discharge inducing passage in an incompletely sealed state. When gas is generated from the unit battery cells 110, explosion or a rapid chemical reaction equivalent to the explosion may occur, and thus an explosive amount of gas may be generated within a short period of time. Thus, if a duct for discharging gas is formed in a battery pack, the gas may be easily discharged.

The side frames 140 may be disposed at sides of the unit battery cells 110 so as to support the unit battery cells 110 from side surfaces of the unit battery cells 110. The side frames 140 may extend by a uniform width from one of the end plates 150 to the other of the end plates 150.

One or more through holes 141 may be formed in each of the side frames 140 so as to reduce the load or weight of the side frames 140. Also, the side frames 140 may include side frame bent portions 142 bent away from the unit battery cells 110 and thus may increase the strength of the side frames 140 against bending.

Figure 7:
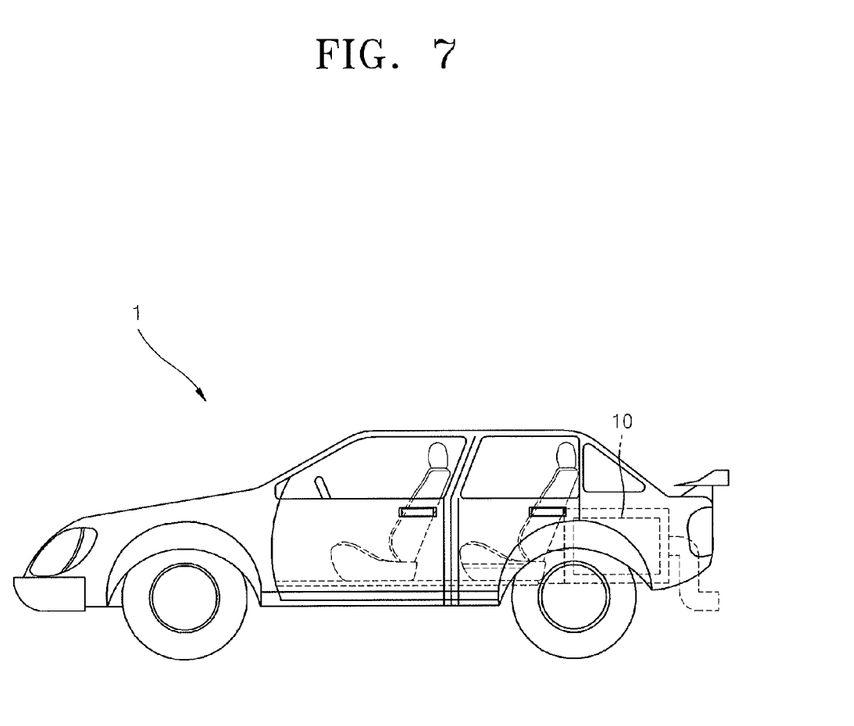
FIG. 7 illustrates an image of an electric vehicle, e.g., car, which employs the battery pack of FIG. 6, according to an embodiment.

FIG. 6 illustrates a battery pack 10 formed by stacking a plurality of the battery modules 100 of FIG. 1 vertically and horizontally and supported by an external frame 300. FIG. 7 illustrates an image of an electric vehicle, e.g., car 1, that employs the battery pack 10 of FIG. 6, according to an embodiment.

Referring to FIG. 6, a battery module 100 may be formed by horizontally stacking a plurality of unit battery cells 110, and two rows of battery modules 100 may be stacked in four layers. Thus, a total of eight (2×4) battery modules may be coupled together to form the battery pack 10.

Each of the battery modules 100 may form a degassing duct D due to coupling of the lower frame of the each battery module 100 to the upper frame 120 of a battery module 100 stacked therebelow. In this case, the battery pack 10 may form eight degassing ducts D.

In the electric car 1 having the battery pack 10 installed therein, the elastic plates 161 that can control elasticity may be inserted between the end plates 150 and the unit battery cells 110, thereby controlling the pressure which is to be applied to the stacked unit battery cells 110. Thus, the pressure which is to be applied to the stacked unit battery cells 110 may be set for each of the battery modules 100. In addition, even when the characteristics of the unit battery cells 110 stacked in the battery module 100 are changed, optimal performance may be achieved.

As described above, according to the one or more of the above embodiments, a battery pack formed by stacking a plurality of battery modules each formed by stacking a plurality of unit battery cells may control or adjust a coupling force in the direction in which the plurality of unit battery cells are stacked.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A battery module, comprising:
unit battery cells, each of the unit battery cells including:
a case having an opening,
an electrode assembly inside the case, and
a cap plate in the opening;
a first end plate and a second end plate, the first end plate and the second end plate being coupled together in a spaced relationship for receiving the unit battery cells therebetween; and
a first pressure control unit between the unit battery cells and the first end plate, the first pressure control unit including:
a control screw, the control screw being configured to move in a first direction, and
an elastic plate, wherein a region of the elastic plate is configured to move away from the first end plate in a second direction as a result of the control screw moving in the first direction, and the first direction is substantially perpendicular to the second direction.

2. The battery module as claimed in claim 1, wherein the first pressure control unit includes:

a support, the support supporting one end of the elastic plate, and
a screw support, the screw support being coupled to the first end plate and supporting the control screw, wherein the control screw is configured to adjust a pressure applied by the elastic plate.

3. The battery module as claimed in claim 2, wherein an end of the control screw protrudes to an outside of the battery module.

4. The battery module as claimed in claim 2, wherein the elastic plate includes a support groove and a control groove, the support groove being coupled to the support and the control groove being coupled to the control screw.

5. The battery module as claimed in claim 4, wherein:
the support groove and the control groove of the elastic plate are spaced apart a first length in an uninstalled condition of the elastic plate, and
the support groove and the control groove of the elastic plate are spaced apart a second length in an installed condition of the elastic plate, such that, through the control screw, the second length becomes adjustably less than the first length and the elastic plate has an arched configuration at a central region thereof, and the central region bows inwardly a distance from the inner side of the first end plate to thereby act as a plate spring.

6. The battery module as claimed in claim 4, wherein the support includes an insertion groove, the insertion groove corresponding to and being coupled to the support groove of the elastic plate.

7. The battery module as claimed in claim 2, wherein the support protrudes from a surface of the first end plate.

8. The battery module as claimed in claim 2, wherein the screw support is disposed opposite to the support on the first end plate.

9. The battery module as claimed in claim 2, wherein the control screw has screw threads on an outer circumference thereof, the screw support has screw threads on an inner circumference thereof, and the screw threads of the control screw mate with the screw threads of the screw support.

10. The battery module as claimed in claim 1, further comprising an intermediate frame coupled to the first and second end plates.

11. The battery module as claimed in claim 10, wherein the intermediate frame includes at least one selected from the group of:
an upper frame coupled to the first and second end plates;
a lower frame coupled to the first and second end plates; and
a side frame coupled to the first and second end plates.

12. The battery module as claimed in claim 1, wherein the first pressure control unit is configured to apply pressure to the unit battery cells between the first and second end plates.

13. The battery module as claimed in claim 1, wherein the first pressure control unit is configured to control an amount of pressure applied to the unit battery cells in restraining the amount of displacement thereof due to expansion and contraction.

14. The battery module as claimed in claim 1, wherein the battery module includes a second pressure control unit, and the second pressure control unit is between the unit battery cells and the second end plate.

15. A battery pack including the battery module as claimed in claim 1.

16. The battery module as claimed in claim 1, wherein the battery module is included in an electric vehicle.

* * * * *